March 28, 1939. E. BUGATTI 2,151,834
DISTRIBUTION CONTROL MECHANISM
Filed April 2, 1937
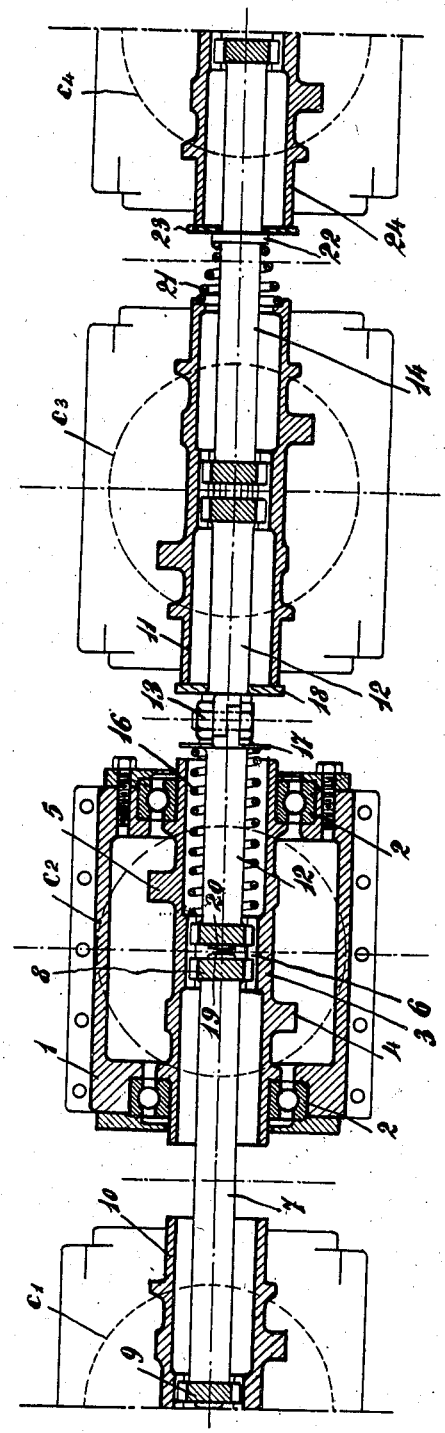
Inventor:—
Ettore Bugatti
By Mauro & Leone
Attorney Patented Mar. 28, 1939

2,151,834

UNITED STATES PATENT OFFICE 2,151,834

DISTRIBUTION CONTROL MECHANISM

Ettore Bugatti, Molsheim, France

Application April 2, 1937, Serial No. 134,655
In France April 18, 1936

5 Claims. (Cl. 64—9)

In multi-cylinder engines or machines having separate cylinders, slight displacements of each cylinder with respect to the adjacent cylinders take place in service, by reason of the elasticity of the assembled parts. Such displacements assume considerable extents in the case in which they have been systematically rendered possible, for instance when the cylinders are arranged in such manner as to be capable of moving elastically and individually with respect to the crankshaft or inversely (see on this point my copending application, filed of even date, Serial No. 134,656 for "Improvements in reciprocating piston engines"). Therefore, it will be readily understood that it is important to provide a mechanism for controlling the cams or other distribution elements which is so devised that no perturbation can take place in the distribution despite the relative movements of the cylinders.

The object of the present invention is to provide a control mechanism which meets this requirement and which is applicable to all piston machines, but especially to piston machines having a plurality of separate cylinders or separate groups of cylinders and each provided with a distribution control shaft carried by the corresponding cylinder.

The essential feature of the present invention is that the distribution shaft corresponding to each cylinder is a hollow shaft which is driven from the shaft of the adjacent cylinder through a spindle projecting into the base of said shaft with considerable play, and connected through its end with the internal part of the shaft, whereby it is enabled to make an angle with the axis of said shaft without, however, bringing any disturbance in the drive of said shaft. In other words, the end of the spindle is coupled with the shaft, on the inside thereof, through a universal connection.

An arrangement which is both simple and easy to construct from an industrial point of view consists, in order to ensure the drive under the conditions above stated, in forming or fixing teeth in the inner wall of the hollow shaft, and in fixing on the spindle, or cutting in a block integral with said spindle, a gear of the same module and with the same number of teeth, by providing between these two toothed parts a very small play the influence of which is negligible from the standpoint of the drive of the shaft, but which, on the contrary, permits a relatively important angular displacement of the axis of the shaft and the axis of the spindle with respect to each other. The arrangement which has been described has the further advantage of allowing two adjacent cylinders to move toward, or away from, each other, without interfering in any way with the drive.

When several adjacent cylinders must have their distribution shafts, for instance camshafts, driven from the same element, the successive spindles which, starting at least from the second one, carry gears at both ends respectively, are placed end to end. The line thus formed may, at least at the free end, be resiliently pressed so as to prevent separation of its abutting spindles or be applied at this place against an abutment. Preferably, the ends of the spindles have convex contact faces. If need be, in order to prevent possible rattling or noise of the spindle line and to buffer longitudinal reactions, I may interpose elastic means such as springs or rubber discs between two consecutive spindles.

In order to facilitate disconnection of the shafts, I may make each of the driving spindles of two or more parts and interconnect these elementary parts through detachable coupling means.

Other features of the present invention will result from the following detailed description of some specific embodiments thereof.

A preferred embodiment of the present invention will be hereinafter described, with reference to the accompanying drawing given merely by way of example, and in which:

The only figure is a diagrammatical view of the distribution control mechanism corresponding to four consecutive cylinders.

In the example shown in the drawing for illustrating an application of the invention, it has been supposed that the machine was an internal combustion engine of the type having overhead cam-shafts, and, on this single figure, I have shown several embodiments which, for practical purposes, are not necessarily combined together, only one of them being, for instance, adopted. The cylinders are shown in a diagrammatic manner and are designated by reference characters $C_1$, $C_2$, $C_3$, $C_4$. Each cylinder carries, at its end, a casing which has been shown only for cylinder $C_2$. The whole of the crankcase is designated by reference character 1. In the case 1, there is mounted, with the interposition of ball bearings 2, a shaft 3 carrying cams 4 and 5. This shaft is hollow and, about midway between the ball bearings, it is fitted with internal teeth 6.

The hollow shaft 3 is driven by a spindle which is provided at its end with a gear 8 having the same module and the same number of teeth as gear 6. Owing to the very slight play provided between the meshing teeth, the axis of spindle 7 can make, with the axis of shaft 3, a relatively large angle in any direction, whereby cylinder $C_2$ can move slightly about its mean position, without any disturbance in the drive of shaft 3 by spindle 7.

In the example shown by the drawing, spindle 7 is provided at its opposite end with a gear 9 similar to gear 8 and which receives from the hollow shaft 10 of the cylinder $C_1$ the torque to be transmitted to shaft 3. This shaft 3 in turn transmits the driving torque to the hollow shaft of cylinder $C_3$ through the intermediate of a spindle 12. This spindle 12 is made of two parts assembled by means of bolts at 13, which permits of taking it to pieces. It is, for instance, possible to inspect shaft 11 separately and remove it without perturbing in any way the drive of shaft 3.

I have indicated, by way of example, means for urging certain spindles toward the right hand side either against abutments or against the next spindles. Thus, in the arrangement shown by the drawing, the shaft 12 is pushed by a spring 16 which bears upon teeth 6 and acts upon a collar 17. An annular element 18, interposed between the joint 13 and the end of shaft 11, plays the part of abutment.

Spindles 7 and 12 bear against each other through convex parts 19 and 20.

Spindle 14 also is pushed toward the right hand side by a spring 21 but in this case the spring is interposed between the shaft 11 and a collar 22, which bears upon the next shaft 24 through the medium of an annular element 23.

Of course, it should be well understood that while I have, in the above description, disclosed what I deem to be practical and efficient embodiments of the present invention, I do not wish to be limited thereto as there might be changes made in the arrangement, disposition and form of the parts without departing from the principle of the present invention as comprehended within the scope of the appended claims.

What I claim is:

1. In an engine having a plurality of cylinders, the combination of a hollow distribution shaft for each cylinder, internal teeth on the inner wall of each of said shafts in the intermediate part of the length thereof, respectively, a plurality of spindles, each adapted to interconnect two adjacent shafts, each of said spindles engaging in both of the shafts with which it cooperates with an important play, gears carried by the respective ends of each spindle, having each the same module and same number of teeth as the internal teeth of the corresponding shaft and meshing therewith with a slight play adapted to permit important angular relative displacements of the axes of the spindle and the corresponding shaft without interfering with the good working of the drive, all these spindles being disposed end to end, an abutment for the line of spindles thus formed, and elastic means and a stop for determining the position of one of said spindles.

2. In a multi-cylinder engine, a line of separate cylinders; an internally dentated tubular distribution control shaft for each cylinder, the various shafts being longitudinally spaced apart from each other but arranged in line; bearing means for rotatably mounting each shaft on the corresponding cylinder; a shaft coupling spindle freely passing through the bores in two adjacent shafts, from the middle part of one of them to the middle part of the other; and a flat externally dentated disc at each end of the spindle, arranged in intermeshing relation with the corresponding internally dentated shaft.

3. In a multi-cylinder engine, a line of internally dentated tubular cam shafts individually liable, in operation, to assume out-of-alignment positions; two separate flat discs having peripheral dentations for operative intermeshing engagement with each dentated shaft, located within said shaft, in the middle portion thereof; and torque transmission means operatively interposed between the two opposite discs in two successive shafts, for coupling said discs together.

4. In a cam drive, the combination of normally aligned, bored cam-shaft sections spaced apart from one another; a longitudinally movable device for transmitting torque from one section to the other, said device extending from a point within the bore in one section to a point within the bore in the other section and having universal connection with the sections at said points; resilient means backed by one section to elastically limit the longitudinal movement of the device in one direction; and stop means adapted for operative engagement with the other section, to limit the longitudinal movement of the device in the opposite direction.

5. In a multi-cylinder engine, a discontinuous line of internally dentated tubular cam shafts, spaced apart from one another along said line and individually liable, in operation, to assume out-of-alignment positions; a continuous line of separate convex ended spindles extending within the tubular line of cam shafts, the spindles being arranged end to end and being each provided at their respective ends with peripherally projecting dentations for respective engagement with two successive dentated cam shafts in the middle portions thereof; and stop means having operative engagement with the end shafts in the line of shafts and with the end spindles in the line of spindles for locating the longitudinal position of the latter line in the former line.

ETTORE BUGATTI.